United States Patent [19]

Biensan

[11] Patent Number: 4,734,464

[45] Date of Patent: Mar. 29, 1988

[54] METHOD OF PREPARING MODIFIED POLYIMIDES OR POLY(AMIDE-TMIDES)

[75] Inventor: Michel Biensan, Lons, France

[73] Assignee: M&T Chemicals Inc., Woodbridge, N.J.

[21] Appl. No.: 834,175

[22] Filed: Feb. 26, 1986

[30] Foreign Application Priority Data

Mar. 1, 1985 [FR] France .................. 85 03025

[51] Int. Cl.$^4$ .................................................. C08F 283/04
[52] U.S. Cl. ........................................ 525/420; 525/430; 525/474; 528/26; 528/350; 528/351; 528/353
[58] Field of Search .................. 525/420, 431, 474; 528/350, 351, 353, 26

[56] References Cited

U.S. PATENT DOCUMENTS 3,847,867 11/1974 Heath .................................. 528/172
3,926,911 12/1975 Greber et al. ...................... 525/431
4,395,527 7/1983 Berger ................................. 528/26

Primary Examiner—Melvyn I. Marquis
Attorney, Agent, or Firm—S. H. Parker; R. Bright

[57] ABSTRACT

Polyimides or poly(amide-imides), especially those containing a polysiloxane unit are improved by heating such polymers or their polyamic acid precursors with a polyfunctional aromatic compound. The polyfunctional aromatic compound is one which contains at least two reactive groups which may be —NH$_2$, —COOH, —OH or secondary amino groups with at least one of the reactive groups being —NH$_2$ or —COOH.

19 Claims, No Drawings

METHOD OF PREPARING MODIFIED POLYIMIDES OR POLY(AMIDE-TMIDES)

FIELD OF THE INVENTION

This invention deals with polyimides or poly(amide-imides) and in particular with those polyimides or poly(amide-imides) containing a polysiloxane unit. It more particularly relates to a method of modifying the properties of polyimides or poly(amide-imides) including or not siloxane units in these chains and to the modified polymers produced thereby.

BACKGROUND OF THE INVENTION

There is a great deal of interest in polymers such as polyimides or poly(amide-imides) which are thermoplastic in nature and can be fabricated by conventional molding techniques or are soluble and can be used as coatings, adhesives and the like.

It is disclosed, for example, in U.S. Pat. Nos. 3,699,075 and 3,812,159 to Lubowitz, U.S. Pat. No. 3,847,867 to Heath et al and U.S. Pat. No. 3,879,428 to Heath that aromatic diether polycarboxylic acids and anhydrides thereof could be reacted with aromatic diamines to prepare thermally stable, high molecular weight polyimides which are soluble in organic solvents and fusible. Such polyimides are suggested as being suitable for use in preparing coatings, adhesives, films and the like or for fabrication into useful parts by conventional molding equipment. However, known polyimides prepared in this manner appear to exhibit generally poor solvent resistance.

Recently, as disclosed in U.S. Pat. No. 4,395,527, it has been found that the properties of a variety of polymers can be improved by the presence of a siloxane unit of formula

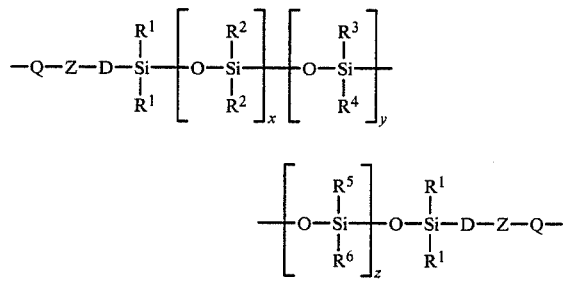

wherein
Q is a substituted or unsubstituted aromatic group;
Z is

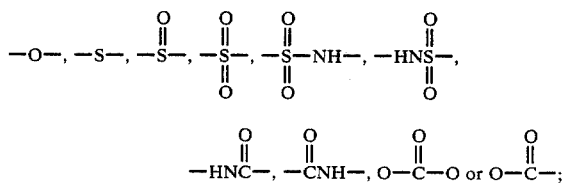

D is substituted or unsubstituted hydrocarbylene;
$R^1$, $R^2$, $R^3$, $R^4$, $R^5$ and $R^6$ each independently is substituted or unsubstituted hydrocarbyl;
x, y and z each independently has a value from 0 to 100;

and that polymers such as polyimides and poly(amide-imides) containing these units are generally thermoplastic and soluble in conventional solvents.

In addition to being soluble and/or thermoplastic, it would be highly desirable of the properties of such kinds of polyimides or poly(amide-imides) containing or not siloxane units could be modified to meet specific needs without substantial loss of the desirable mechanical, electrical, thermal and other qualities of the polymer.

SUMMARY OF THE INVENTION

In accordance with the present invention there is provided a method for modifying and/or improving the properties of a polymeric material selected from the group consisting of those polyimides, poly(amide-imides) and corresponding siloxane-containing polymers that are thermoplastic or tractable and soluble, which comprises heating said polymeric material or the polyamic acid precursor, thereof, to a temperature of at least about 150° C. and below the decomposition temperature of said polymer and, preferably, heating said polymeric material or its polyamic acid precursor in the presence of at least one modifying additive selected from those polyfunctional aromatic compounds that are defined hereinbelow.

It has been found that, in accordance with the practice of the invention, the properties of thermoplastic and soluble polyimides, poly(amide-imides) and corresponding siloxane-containing polymers can be modified and generally improved without any detrimental effect thereto.

Thus, for example, the properties of a preimidized siloxane-containing polyimide applied in a solution form as a coating or adhesive to a finished product or cast into film can be modified to provide a product or a polymer which displays added solvent resistance.

In accordance with the present invention the properties of a polymeric material selected from the group consisting of polyimides, poly(amide-imides) and corresponding siloxane-containing polymers can be modified and/or improved by heating said polymeric material to a temperature of at least 150° C. and below the temperature at which decomposition will occur, and, preferably, heating said polymeric material or a polyamic acid precursor thereof in the presence of at least one modifying additive selected from the group consisting of polyfunctionnal aromatic compounds which contain at least two reactive groups selected from the group consisting of —NH$_2$, —COOH, —OH and secondary amino groups with at least one of the reactive groups being —NH$_2$ or —COOH.

It has been found that the properties of those polyimides, poly(amide-imides) and corresponding siloxane-containing polymers, that before modification are thermoplastic or tractable in nature and/or are soluble in conventional solvents, thus, can be modified and generally improved.

As is known, polyimides are prepared by reacting a dianhydride with a diamine to form polymers comprising recurring structural units of the formula

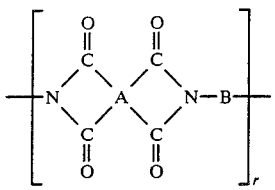

(I)

wherein A is a tetravalent residue of a tetracarboxylic acid anhydride, B is the divalent residue of an organic amine, and r is an integer greater than 1 and preferably from 10 to 10,000.

In U.S. Pat. No. 4,395,527, applicable siloxane-containing preimidized polyimides which are thermoplastic and/or are soluble in organic solvents and contain a unit of the formula

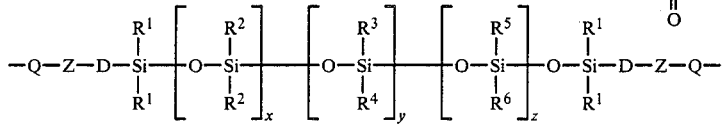

where
Q is a substituted or unsubstituted aromatic group;
Z is

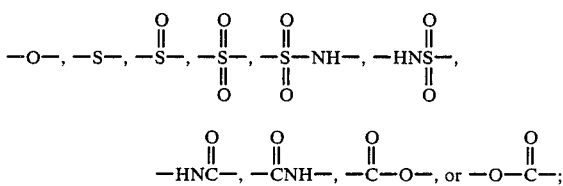

D is unsubstituted or substituted hydrocarbylene;
$R^1$, $R^2$, $R^3$, $R^4$, $R^5$ and $R^6$ each independently are substituted or unsubstituted hydrocarbyl;
x, y and z each independently has a value from 0 to 100.

As disclosed in said patent, siloxane-containing polyimides which are thermoplastic and soluble include the reaction product of an aromatic or aliphatic tetracarboxylic acid anhydride with a bis(functional)polysiloxane of the formula

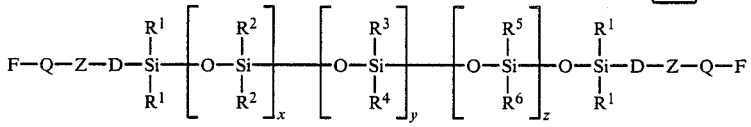

wherein F is a functional group such as $NH_2$ and the various elements are all as previously defined, to provide a polyimide containing a unit or units of formula I.

The dianhydride used in the preparation of polyimides containing or not siloxane can be represented by the formula

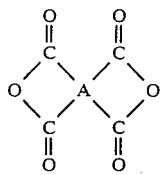

IV wherein A is the tetravalent residue of a tetracarboxylic acid anhydride.

The polyimide to be modified according to the invention will contain at least one unit of formula I

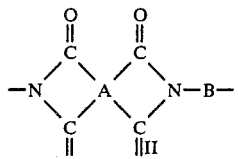

II wherein —B— can be solely the residue of one or more organic diamines or the unit of formula II which is the residue of a bis(amino)polysiloxane of formula III or can comprise one or more organic diamines in addition to a bis(amino)polysiloxane.

Suitable organic diamines can have the general formula $$H_2N—Y—NH_2 \qquad V$$

wherein Y is a divalent residue that can be aliphatic, including alkylene of 1 to 20 carbon atoms or cycloalkylene of 4 to 8 carbon atoms, or, preferably, the residue of an aromatic diamine. Thus, Y can be phenylene, diphenylene, naphthylene or a group of formula

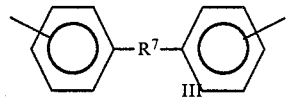

VI where $R^7$ is branched or linear alkylene of 1 to 20 carbon atoms,

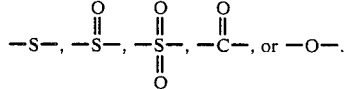

The aryl nuclei can be substituted by lower alkyl, lower alkoxy or other noninterfering groups.

Among the organic diamines that are useful are:
m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis (amino-t-butyl)toluene;
bis (p-amino-t-butyl)phenyl ether;
bis (p-methyl-o-aminopentyl)benzene;
1,3-diamino-4-isopropylbenzene;    1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4'-dimethylheptamethylenediamine;    2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis-(3-aminopropyl)amine;
hexamethylenediamine;
heptamethylenediamine;
nonamethylenediamine; and mixtures thereof.

$R^7$ can also be the group of formula —O—G'—O— where G' is phenylene or a group of formula

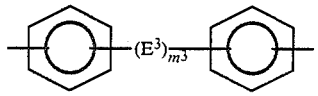

VII where
$m^3$ is 0 or 1 and
$E^3$ is

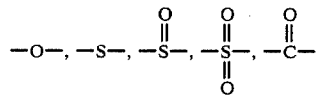

or linear or branched alkylene of 1 to 8 carbon atoms.

Aromatic nucleus Y can be mono-carbocyclic aromatic or polycarbocyclic aromatic of 6 to 14 carbon atoms such as benzene, naphthalene anthracene, etc. These nuclei can be further substituted by non-interfering groups, such as lower alkyl.

The nucleus Y can also be heterocyclic aromatic of 6 to 20 atoms while the heteroatoms are one or more of N, O and S, such as pyridine, pyrimidine, pyrazine, oxadiazine, oxathiazine, triazine, benzofuran, thionaphthene, indole, quinoline, benzoxazole, benzothiophene and carbazole.

Specific compounds include:
2,4-diaminochlorobenzene;
2,4-diaminothiophenol;
2,4-diaminophenol;
3,5-diaminobenzoic acid;
methyl-2,4-diaminobenzoate;
2,4-diaminoacetamide;
1-(para-carbomethoxyphenoxy)-2,4-diaminobenzene;
p-(2,4-diaminophenoxy)acetamilide;
3-mercapto-4-amino-4-aminobiphenyl;
1(2'-cyanophenyl)-2,5-diaminonaphthalene.

As indicated hereinbefore part or all of the units —B— can represent a siloxane unit of formula II and in particular a siloxane unit of formula II wherein:

Q is substituted or unsubstituted carbocyclic aromatic of 6 to 18 ring carbon atoms or substituted or unsubstituted heterocyclic aromatic of 5 to 18 ring atoms where the hetero atoms are selected from N, O and S, and where the substituents are alkyl of 1 to 12 carbon atoms, alkenyl of 2 to 12 carbon atoms, alkynyl of 2 to 12 carbon atoms, cycloalkyl of 4 to 8 carbon atoms, alkoxy of 1 to 12 carbon atoms, alkylthio of 1 to 12 carbon atoms, phenyl, alkylphenylene having 1 to 12 carbon atoms in the alkyl group, phenoxy, phenylthio, alkylcarbonyloxy of 2 to 12 carbon atoms, phenylalkylene of 1 to 12 carbon atoms in the alkylene group, alkylcarbonyl of 2 to 12 carbon atoms, alkoxycarbonyl of 2 to 12 carbon atoms, bromo, chloro, fluoro, iodo, nitro, cyano, cyanothio, carboxy, carbonyl, hydroxy, mercapto, formyl, thioformyl and mercaptocarbonyl;

D is substituted or unsubstituted hydrocarbylene of 1 or 3 to 18 carbon atoms;

$R^1$, $R^2$, $R^3$, $R^4$, $R^5$ and $R^6$ each independently, is an unsubstituted or substituted alkyl of 1 to 12 carbon atoms, alkenyl of 2 to 12 carbon atoms, alkynyl of 2 to 12 carbon atoms, cycloalkyl of 4 to 8 carbon atoms, phenyl, alkylphenylene where the alkyl group contains 1 to 12 carbon atoms, phenyalkylene where the alkylene group contains 1 to 12 carbon atoms, or alkenylphenylene with 2 to 12 carbon atoms in the alkenyl group and when substituted, these hydrocarbyl groups are substituted by Br, Cl, I, F, —NC, —NO$_2$, —OCN, alkoxy of 1 to 8 carbon atoms, —S—(C$_1$-C$_8$)alkyl,

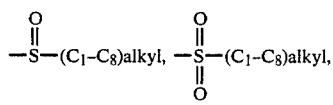

—S—S—(C$_1$-C$_8$)alkyl, —COOH, —COSH, —CSOH, —CONH$_2$, —CN, —CHO, —CHS, —OH, —SH, —NCO and —NR$_a$R$_b$ where R$_a$ and R$_b$ indpendently are hydrogen or lower alkyl.

For these particular siloxane units D is preferably a linear or branched alkylene of 1 or 3 to 12 carbon atoms and/or x, y and z are such that $0 \leq x \leq 100$, $0 \leq y \leq 20$ and $0 \leq z \leq 20$ and more preferably are each equal to zero. Especially in these siloxane units R1 is an unsubstituted hydrocarbyl radical of 1 to 18 carbom atoms, R2 is an alkyl radical of 1 to 12 carbon atoms, R3 is a radical selected from the group consisting of phenyl radical, alkylphenyl radicals of 7 to 18 carbon atoms and alkyl radicals of 1 to 12 carbon atoms, R4 is a radical selected from the group consisting of alkyl radicals of 1 to 12 carbon atoms, phenyl radical, alkylphenyl radicals of 7 to 18 carbon atoms and alkenyl radicals of 2 to 12 carbon atoms, R5 is an alkenyl radical of 2 to 12 carbon atoms or a substituted alkyl radical of 1 to 12 carbon atoms and R6 is a radical selected from the group consisting of alkyl radicals of 1 to 12 carbon atoms, phenyl radical, alkylphenyl radicals of 7 to 18 carbon atoms and alkenyl radicals of 2 to 12 carbon atoms.

Most suitable siloxane units are those with the formula VIII below:

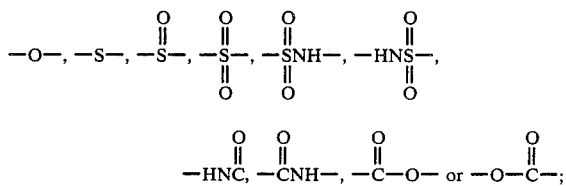

where
v is 0 to 4;
$R_c$ is each independently lower alkyl, lower alkenyl, lower alkynyl, cycloalkyl of 4 to 8 carbon atoms, lower alkoxy, lower alkylthio, phenyl, lower-alkylphenylene, phenyl-loweralkylene, lower-alkenylphenylene, phenoxy, phenylthio, lower-alkylcarbonyl, lower-alkylcarbonyloxy, lower-alkoxycarbonyl, bromo, chloro, fluoro, iodo, nitro, cyano, cyanothio, carboxyl, carbonyl, hydroxyl, mercapto or mercaptocarbonyl;
Z is

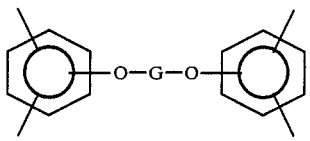

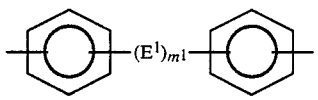

$D_1$ is methylene or alkylene of 3 to 8 carbon atoms;
$R^{10}$ is lower alkyl, lower alkenyl, lower alkynyl, phenyl, lower alkylphenylene, phenyl-loweralkylene, or loweralkenylphenylene.

Preferred siloxane units with the formula VIII are those where v is zero or 1 and R10 is a lower alkylradical with in these preferred siloxane units Z being especially —O—. Examples of such siloxane units of formula VIII are those for which v is zero or 1, preferably zero, Z is —O—, D1 is methylene, propylene or butylene, especially methylene or butylene, and $R^{10}$ is an alkyl radical of 1 to 3 carbon atoms and especially a methyl radical.

As disclosed and illustrated by U.S. Pat. No. 4,395,527, in the dianhydride of general formula

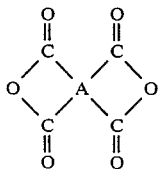

A is a tetravalent radical selected from substituted and unsubstituted aliphatic, cycloaliphatic, heterocyclic, aromatic groups and combinations thereof. Thus, A can be a tetravalent benzene or naphthalene nucleus or a tetravalent group of formula

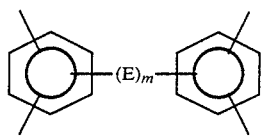

where m is 0 or 1 and E is

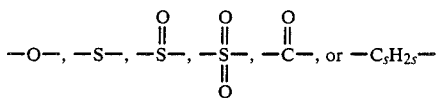

where s is an integer from 1 to 8.
A can also be a tetravalent residue of formula

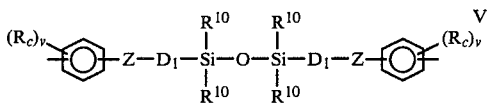

where G is phenylene or a group of formula

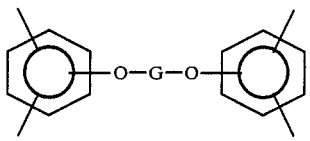

where $m^1$ is 0 or 1 and $E^1$ is selected from the same group as E.

The anhydride can also be aliphatic in nature, such as cyclopentane, tetracarboxylic acid dianhydride, cyclohexane tetracarboxylic acid dianhydride and butane tetracarboxylic acid dianhydride.

Representative specific anhydrides include:
pyromellitic dianhydride;
3,3',4,4'-benzophenone tetracarboxylic dianhydride;
2,2',3,3',-benzophenone tetracarboxylic dianhydride;
3,3',4,4'-diphenyl tetracarboxylic dianhydride;
2,2',3,3'-diphenyl tetracarboxylic dianhydride;
2,2-bis-(3,4-dicarboxyphenyl)propane dianhydride;
2,2-bis-(2,3-dicarboxyphenyl)propane dianhydride;
bis-(3,4-dicarboxyphenyl)ether dianhydride;
bis-(3,4-dicarboxyphenyl)sulfone dianhydride;
bis-(3,4-dicarboxyphenyl)sulfide dianhydride;
1,1-bis-(2,3-dicarboxyphenyl)ethane dianhydride;
1,1-bis-(3,4-dicarboxyphenyl)ethane dianhydride;
bis-(2,3-dicarboxyphenyl)methane dianhydride;
bis-(3,4-dicarboxyphenyl)methane dianhydride;
2,3,6,7-naphthalene tetracarboxylic dianhydride;
1,2,4,5-naphthalene tetracarboxylic dianhydride;
1,2,5,6-naphthalene tetracarboxylic dianhydride;
benzene-1,2,3,4-tetracarboxylic dianhydride;
perylene-3,4,9,10-tetracarboxylic dianhydride;
pyrazine-2,3,5,6-tetracarboxylic dianhydride;
thiophene-2,3,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;

2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
cyclopentane-1,2,3,4-tetracarboxylic dianhydride;
pyrrolidine-2,3,4,5-tetracarboxylic dianhydride;
pyrazine-2,3,5,6-tetracarboxylic dianhydride;
1,2,3,4-butane tetracarboxylic dianhydride;
3,4,3',4'-benzophenone tetracarboxylic dianhydride;
azobenzene tetracarboxylic dianhydride;
2,3,4,5-tetrahydrofuran dianhydride;
p-phenylenebis(trimellitate)anhydride;
1,2-ethylenebis(trimellitate)anhydride;
2,2-propanebis(p-phenylene trimellitate)anhydride;
4,4'-[p-phenylenebis(phenylimino)carbonyldiphthalic-]anhydride;
2,2-bis[4,4'-di(3,4-dicarboxyphenoxy)phenyl]propane dianhydride;
p-bis(3,4-dicarboxyphenoxy)phenyl dianhydride;
4,4'-bis(3,4-dicarboxyphenoxy)diphenyl dianhydride;
bis-[4,4'-di(3,4-dicarboxyphenoxy)phenyl]sulfone dianhydride;
bis[4,4'-di(3,4-dicarboxyphenoxy)phenyl]sulfide dianhydride.

Also applicable for use in accordance with the practice of the invention are polysiloxane-containing polyimides such as disclosed, for example, in U.S. Pat. No. 3,847,867. There is disclosed in such patent, polyetherimides of the general formula I wherein A is a unit of the formula

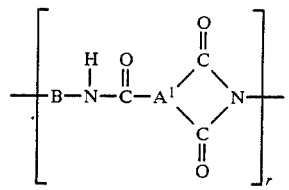
XII wherein X is a divalent aromatic radical selected from particular classes of substituted phenyls, substituted biphenyls and bridged phenyl groups; and B is the divalent residue of an organic diamine including a $C_{(3-8)}$ alkylene terminated polydiorganosiloxane such as derived from a di(aminoalkyl)polysiloxane of the general formula

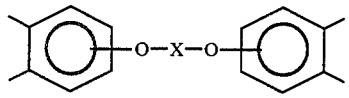
XIII wherein $R^1$ is an hereinabove defined and $R^8$ is a divalent hydrocarbon and r is a whole number equal to or greater than 1.

Also applicable are poly(amide-imide) compositions containing or not linear polysiloxane units. Such polymers containing linear polysiloxane units are disclosed and illustrated by U.S. Pat. No. 4,395,527.

Poly(amide-imide) is the reaction product of an organic diamine with a tricarboxylic acid anhydride to form polymers comprising structural units of formula XIV

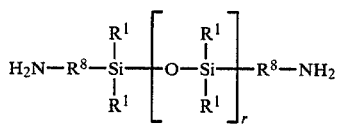
XIV wherein
$A^1$ is a trivalent organic radical of a tricarboxylic acid anhydride;
B is a divalent residue as hereinabove defined; and
r is an integer greater than 1, and preferably from 10 to 10,000.

Exemplary tricarboxylic acid anhydrides which will react with organic diamines to form suitable poly(amide-imide) compositions include such compounds as:
trimellitic anhydride;
2,6,7-naphthalene tricarboxylic anhydride;
3,3',4-diphenyl tricarboxylic anhydride;
3,3',4-benzophenone tricarboxylic anhydride;
1,3,4-cyclopentane tetracarboxylic anhydride;
2,2',3-diphenyl tricarboxylic anhydride;
diphenyl sulfone-3,3',4-tricarboxylic anhydride;
diphenyl isopropylidene-3,3', tricarboxylic anhydride;
3,4,10-propylene tricarboxylic anhydride;
3,4-dicarboxyphenyl-3-carboxyphenyl ether anhydride;
ethylene tricarboxylic anhydride; etc.

Also useful are the corresponding acids of such anhydride and the triacid anhydride analogues of the diether-containing anhydrides described above in connection with the polyimides.

The diamine reactant can be selected from the diamines $H_2N—Y—NH_2$ previously defined.

Part or all of the diamine reactant which can be used to form suitable poly(amide-imide) compositions can be a bis(amino-siloxane) of formula III or a di(aminoalkyl)-polysiloxane of the general formula

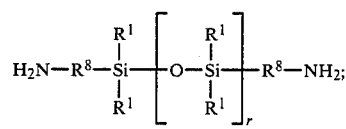
XIII wherein $R^8$, $R^1$ and r are as hereinabove defined; and part of the anhydride reactant can be replaced by a siloxane-containing triacid anhydride.

As indicated, in accordance with the process of the present invention the properties of thermoplastic polymeric material, as herein described, can be modified and/or improved by heating said polymeric material or its polyamic acid precursor between a temperature of at least 150° C. and below the decomposition temperature of said polymer, and preferably heating said polymeric material or a polyamic acid precursor thereof, in the presence of at least one modifying additive as hereinbefore defined.

Polyfunctional aromatic compounds which are suitable for use as a modifying additive in accordance with the practice of the invention can be selected from the group consisting of aromatic polyamines, aromatic aminoacids, aromatic polycarboxylic acids, aminophenols and carboxyphenols, and preferably from those compounds of said group that are generally non-reactive with the polymer under ambient conditions.

The nucleus of useful polyfunctional modifying additives can be any di-, tri- or tetravalent/radical of 6 through 20 carbon atoms. Such nucleus can be, for example.

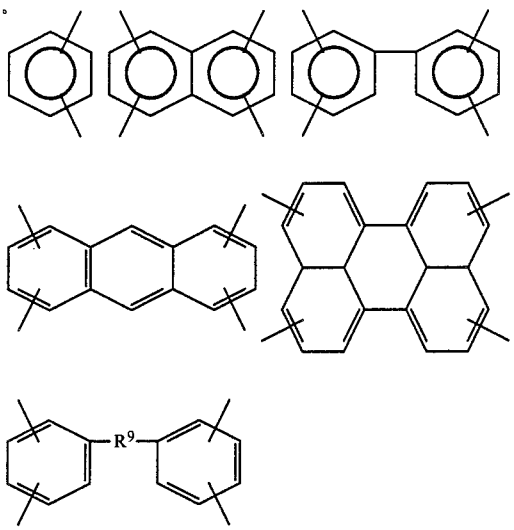

and the like where $R^9$ is selected from the group consisting of any alkylene chain having 1-3 carbon atoms, $-O-$, $-S-$, $-SO_2-$,

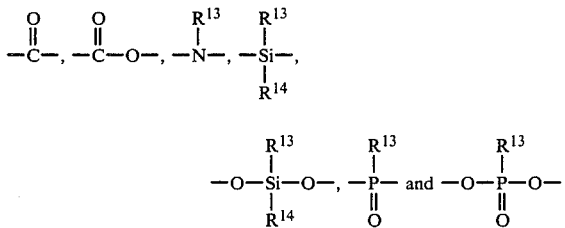

where $R^{13}$ and $R^{14}$ are selected from the group consisting of alkyl and aryl and preferably from lower alkyls.

Most preferred modifying additives as herein before defined are those for which the reactive groups are selected from the group consisting of $-NH_2$ and secondary aminogroups with the formula $-NHR_{13}$, these preferred additives being aromatic polyamines.

Representative useful polyamines include:
bis(4,4'-diaminophenyl)ether
bis 4-(beta-aminoethylamino)phenyl ether
2-4-bis(beta-amino-t-butyl)toluene
bis-(para-beta-amino-t-butylphenyl)ether
m-phenylenediamine
benzidine
3,3'-diaminobenzidine
3,5-diethyltoluene 2,4-diamine
3,5-diethyltoluene 2,6-diamine
p-phenylenediamine
4,4'-diaminodiphenylpropane
4,4'-diaminodiphenylmethane
4,4'-diaminodiphenylsulfide
3,3'diaminodiphenyl sulfone
bis-(4-aminophenyl)diethylsilane Suitable modifying additives generally can be incorporated into the polymeric material as previously defined at any time after said polymeric material has been prepared to provide a source of such material for carrying out the process of this invention or even into a polyamic acid precursor of the polymeric material. Thus, for example, when it is desired to use preimidized polyimide which has been prepared by any of the known melt polymerization or solvent polymerization techniques, the modifying additive may be incorporated into the polymer at any time prior to the use thereof. Generally, the modifying additive would advantageously be incorporated into the polymer in a manner that will conveniently coordinate with the fabrication technique to be used for the polymer. Thus, for example, when a solution or paste composition of the polymer is used for a coating or adhesive application, a compatible solution of the particular modifying additive would be prepared and then incorporated into the polymer-containing composition. A compatible paste or solution of said additive could also be used for incorporating the additive into the polymer during extrusion and injection or compression molding.

It should be understood, however, that modifying additives suitable for use in the present invention are generally non-reactive with the polymer under ambient conditions and, thus, can be incorporated therein in generally any convenient form ("neat" 100% active, solution, paste, masterbatch, etc.) at essentially any time subsequent to the preparation thereof.

The amount of modifying additive used in accordance with the practice of the invention can vary over a wide range and will depend on several factors, including, but not limited to, the particular polymer to be modified, the temperature to which the polymer can be subjected and the application for which it is intended. In general, while the amount of said additive that should be used in not critical it would be advantageous to use at least about 0.1 mole percent of said modifying additive based on the molar concentration of imide groups of the polymer.

The foregoing specification has described a variety of molecular configurations of polymeric materials to which the process of the invention is applicable. The invention is further illustrated in the following examples. All parts and percentages are by weight unless otherwise indicated.

EXAMPLE 1

A polyimide was prepared using the procedure of U.S. Pat. No. 4,395,527 from substantially equally molar proportions of benzophenonetetracarboxylic dianhydride

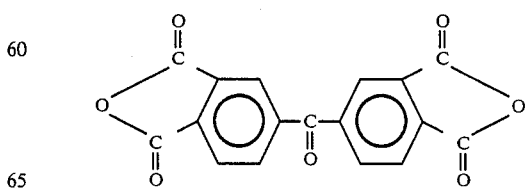

and bis(m-aminophenoxybutyl)hexadecamethyloctasiloxane

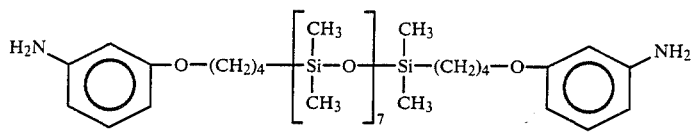

A solution containing 10% by weight of said polyimide was prepared in N-methyl-pyrrolidone (NMP) and the polymer solution was divided into a series of separate samples to which 5 molar percent of various polyfunctional amines were added. Each of the amine additives used were first dissolved in NMP prior to adding to the polymer solution. Film samples were prepared from each of the solution samples by coating on the surface of a glass panel and then heating 1 hour at 100° C. to prepare a dried film. Samples of dried film were then heated using the following time/temperature schedules:

2 hours at 135° C.
2 hours at 180° C.
2 hours at 250° C.
1 hour at 300° C.

Film samples subjected to each of the above-noted time/temperature schedules were then subjected to 24-hour Soxhlet extraction in chloroform. Summarized in Table I below is the percent by weight of each of the film samples that remained undissolved after extraction in chloroform:

TABLE I

| ADDITIVE | % POLYMER NOT DISSOLVED | | | |
|---|---|---|---|---|
| | 135° C. | 180° C. | 250° C. | 300° C. |
| None | 0 | 23 | 77 | 77 |
| m-phenylene-diamine (MPDA) | 0 | 46 | 87 | 88 |
| p-phenylene-diamine (PPDA) | 0 | 40 | 70 | 94 |
| 4,4-methylene-dianiline (MDA) | 0 | 69 | 73 | 98 |
| bis(4,4'-diamino-phenyl)ether | 0 | 61 | 81 | 88 |

It can been seen from the results shown in Table I that the soluble thermoplastic siloxane-containing polyimide having incorporated therein an aromatic polyfunctional amine displayed a substantial increase in solvent resistance after heating at temperatures above 150° C. Moreover, while an increase in solvent resistance is achieved by heating the polymer itself, there is shown that a significantly greater increase in solvent resistance can be obtained at a lower temperature (180° C.) when the polymer is heated in the presence of the amine additive.

EXAMPLE 2

A siloxane-containing polyimide which is the reaction product of 4,4'-bis(3,4-dicarboxyphenoxy)diphenylsulfide dianhydride and a mixture of 55 mole percent bis(m-aminophenoxybutyl)hexadecamethyloctasiloxane and 45 mole percent of bis[4-(p-aminophenoxy)phenyl]sulfone is used in this example. The procedure disclosed in U.S. Pat. No. 4,395,527 is used to prepare the polyimide.

A 25 percent by weight solution in NMP is prepared from the siloxane-containing polyimide which is divided into a series of separate samples to which 2.5% and 5% by weight of 3,5-diethyltoluene diamine and m-phenylene diamine are added. The amine additives are dissolved in NMP prior to adding to the polymer solution.

Film samples were prepared from each of the solution samples by casting the solution on the surface of a glass panel and then heating for one hour at 60° C. and then one hour at 150° C., 3 hours at 180° C. and 4 hours at 210° C. Film samples are also prepared from polyimide solutions to which no polyfunctional amine is added.

None of the heated film samples dissolve completely when subject to extraction in chloroform, but the heated film samples modified by the amine additives are substantially more insoluble than the film samples prepared without using any amine additive.

EXAMPLE 3

A siloxane-containing polyimide prepared from benzophenone dianhydride and a mixture of 65 mole percent of 4,4'-methylenedianiline and 35 mole percent bis-gamma aminopropyltetramethyldisiloxane is used to prepare film samples from 25% solutions to which 5 weight % of m-phenylenediamine or 5 weight % of diethyltoluene diamine is added. The film samples are not completely dissolved by extraction in chloroform after heating 3 hours at 180° C. When submitted to the same treatment film samples prepared from the corresponding polyimide solutions to which no diamine is added are much more soluble.

EXAMPLE 4

A siloxane-containing polyimide prepared using the procedure disclosed in U.S. Pat No. 4,395,527 from 4,4'-bis(3,4-dicarboxyphenoxy)diphenylsulfide dianhydride and a mixture of 65 mole percent bis (m-aminophenoxybutyl)hexadecamethyloctasiloxane and 35 mole percent 2,2-bis[4-(p-aminophenoxy)phenyl]propane was used in this example.

A 25 percent by weight solution in NMP was prepared from the siloxane-containing polyimide and various amounts of polyfunctional amines were added to samples thereof. The amine additives were dissolved in NMP prior to adding to the polymer solution.

Film samples were prepared by casting on the surface of a glass panel and then heating for one hour at 60° C. and one hour at 150° C. The film samples were aged for 4 hours at 210° C. and then evaluated using the procedure of Example 1.

The amount and type of additive and the change in solvent resistance for each of the film samples is summarized in Table II.

TABLE II

| Additive | Amount (Weight %) | Polymer Not Dissolved (%) After Heat Aging 4 hours at 210° C. |
|---|---|---|
| None | — | 31 |
| 3,5-diethyl toluene diamine | 2.5 | 36.9 |
| 3,5-diethyl toluene diamine | 5.0 | 36.3 |
| m-phenylene diamine | 2.5 | 48.9 |
| m-phenylene | 5.0 | 52.2 |

TABLE II-continued

| Additive | Amount (Weight %) | Polymer Not Dissolved (%) After Heat Aging 4 hours at 210° C. |
|---|---|---|
| diamine | | |

EXAMPLE 5

A polyimide was prepared from substantially equally molar proportions of 4,4'-bis-(p-aminophenoxy)diphenylsulfone and 4,4'-bis(3",4"-dicarboxyphenoxy)diphenylsulfide. The reactants in the form of powders were carefully mixed at room temperature and then put into a Brabender mixer preheated at 240° C. The mixture was then brought to 300° C. at a heating rate of 20° C. per minute. When the reaction chamber of the mixer reached 300° C., the mixture was held at this temperature and agitated for 0.5 hour and then allowed to cool. The reaction product was then scraped from the chamber. It dissolves readily in N-methylpyrrolidone.

A solution containing 10% by weight of said polyimide was prepared in N-methyl-pyrrolidone (NMP) and the polymer solution was divided into a series of separate samples to which 5 molar percent of various polyfunctional amines were added. Each of the amine additives used were first dissolved in NMP prior to adding to the polymer solution. Film samples were prepared from each of the solution samples by coating on the surface of a glass panel and then heating 1 hour at 100° C. to prepare a dried film. Samples of dried film were then heated using the following time/temperature schedule:
 2 hours at 130° C.
 2 hours at 180° C.
 2 hours at 250° C.
 1 hour at 300° C.

Film samples subjected to each of the above-noted time/temperature schedules were then subjected to 24-hour Soxhlet extraction in chloroform. Summarized in Table III below is the percent by weight of each of the film samples that remained undissolved after extraction in chloroform:

TABLE III

| Additive | % Polymer not Dissolved | | |
|---|---|---|---|
| | 130° C. | 250° C. | 300° C. |
| None | 0 | 0 | 30 |
| MPDA | 0 | 62 | 77 |
| PPDA | 0 | 33 | 100 |
| MDA | 0 | 59 | 87 |
| ODA | 0 | 48 | 100 |

It can be seen from the results shown in Table III that the soluble thermoplastic polyimide displayed a substantial increase in solvent resistance after heating the film samples containing the amine additives at temperatures above 150° C.

What is claimed is:

1. A method of modifying the properties of a polymeric material selected from the group consisting of polyimides, poly(amide-imides), and polyimides and poly(amide-imides) containing siloxane units of the formula

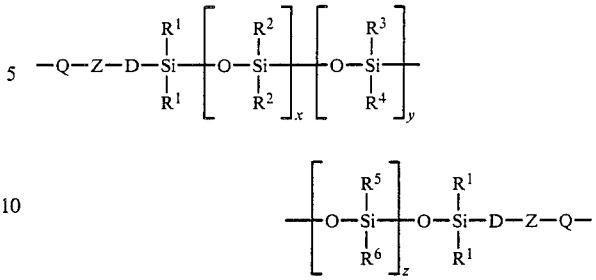

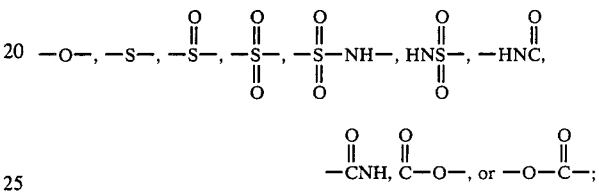

wherein
Q is a substituted or unsubstituted aromatic group;
Z is $-O-$, $-S-$, $-\underset{\underset{O}{\|}}{S}-$, $-\underset{\underset{O}{\|}}{\overset{\overset{O}{\|}}{S}}-$, $-\underset{\underset{O}{\|}}{\overset{\overset{O}{\|}}{S}}-NH-$, $HN\underset{\underset{O}{\|}}{\overset{\overset{O}{\|}}{S}}-$, $-HN\overset{\overset{O}{\|}}{C}$, $-C\overset{\overset{O}{\|}}{NH}$, $\overset{\overset{O}{\|}}{C}-O-$, or $-O-\overset{\overset{O}{\|}}{C}-$;

D is substituted or unsubstituted hydrocarbylene;
$R^1$, $R^2$, $R^3$, $R^4$, $R^5$ and $R^6$ each independently is substituted or unsubstituted hydrocarbyl; and
x, y and z each independently has a value from 0 to 100;
which comprises heating said polymeric material or a polyamic acid precursor thereof to a temperature of at least about 150° C. but below the decomposition temperature of the polymeric material or precursor in the presence of polyfunctional aromatic compounds which contain at least two reactive groups selected from the group consisting of $-NH_2-$, $-COOH$, $-OH$ and secondary amino groups with at least one of the reactive groups being $-NH_2$ or $-COOH$.

2. The method according to claim 1 in which the reactive groups are selected from the group consisting of $-NH_2$ and those secondary amino groups with the formula $NHR_{13}$ wherein $R_{13}$ is an alkyl or aryl group.

3. The method according to claim 1 in which
Q is substituted or unsubstituted carbocyclic aromatic of 6 to 18 ring carbon atoms or substituted or unsubstituted heterocyclic aromatic of 5 to 18 ring atoms where the hetero atoms are selected from the group consisting of N, O and S, and where the substituents are alkyl of 1 to 12 carbon atoms, alkenyl of 2 to 12 carbon atoms, alkynyl of 2 to 12 carbon atoms, cycloalkyl of 4 to 8 carbon atoms, alkoxy of 1 to 12 carbon atoms, alkylthio of 1 to 12 carbon atoms, phenyl, alkylphenylene having 1 to 12 carbon atoms in the alkyl group, phenoxy, phenylthio, alkylcarbonyloxy of 2 to 12 carbon atoms, phenylalkylene of 1 to 12 carbon atoms in the alkylene group, alkylcarbonyl of 2 to 12 carbon atoms, alkoxycarbonyl of 2 to 12 carbon atoms, bromo, chloro, fluoro, iodo, nitro, cyano, cyanothio, carboxy, carbonyl, hydroxy, mercapto, formyl, thioformyl or mercaptocarbonyl;
D is substituted or unsubstituted hydrocarbylene of 1 or 3 to 18 carbon atoms;
$R^1$, $R^2$, $R^3$, $R^4$, $R^5$ and $R^6$ each independently, is an unsubstituted or substituted alkyl of 1 to 12 carbon atoms, alkenyl of 2 to 12 carbon atoms, alkynyl of 2 to 12 carbon atoms, cycloalkyl of 4 to 8 carbon atoms, phenyl, alkylphenylene where the alkyl group contains 1 to 12 carbon atoms, phenylalkylene where the alkylene group contains 1 to 12 carbon atoms, or alkenylphenylene with 2 to 12 carbon atoms in the alkenyl group and when substituted, these hydrocarbyl groups are substituted by Br, Cl, I, F, —NC, —NO$_2$, —OCN, alkoxy of 1 to 8 carbon atoms, —S—(C$_1$-C$_8$)alkyl,

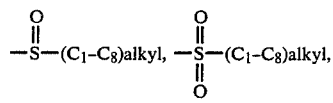

—S—S—(C$_1$-C$_8$)alkyl, —COOH, —COSH, —CSOH, —CONH$_2$, —CN, —CHO, —CHS, —OH, —SH, —NCO and —NR$_a$R$_b$ where R$_a$ or R$_b$ independently are hydrogen or lower alkyl.

4. The method according to claim 3 in which
Q is unsubstituted or substituted carbocyclic aromatic of 6 to 18 ring carbon atoms;
D is branched or linear alkylene of 1 or 3 to 12 carbon atoms; and
x, y and z is each 0.

5. The method according to claim 4 in which the siloxane unit has the formula

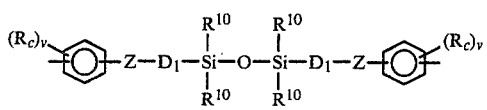

where
v is 0 to 4;
R$_c$ is each independently lower alkyl, lower alkenyl, lower alkynyl, cycloalkyl of 4 to 8 carbon atoms, lower alkoxy, lower alkylthio, phenyl, lower-alkylphenylene, phenyl-loweralkylene, lower-alkenylphenylene, phenoxy, phenylthio, lower-alkylcarbonyl, lower-alkylcarbonyloxy, lower-alkoxycarbonyl, bromo, chloro, fluoro, iodo, nitro, cyano, cyanothio, carboxyl, carbonyl, hydroxyl, mercapto or mercaptocarbonyl;
Z is

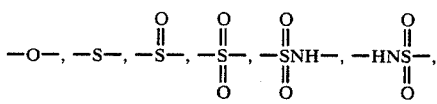

D$_1$ is methylene or alkylene of 3 to 8 carbon atoms;
R$^{10}$ is lower alkyl, lower alkenyl, lower alkynyl, phenyl, lower alkylphenylene, phenyl-loweralkylene, or loweralkenylphenylene.

6. The method according to claim 5 in which v is 0 or 1; and
R$^{10}$ is lower alkyl.

7. The method according to claim 5 in which
v is 0 or 1;
Z is —O—;
R$^{10}$ is lower alkyl.

8. The method according to claim 5 in which
v is 0 or 1;
Z is —O—;
D$_1$ is methylene, propylene or butylene;
R$^{10}$ is alkyl of 1 to 3 carbon atoms.

9. The method according to claim 5 in which
v is 0;
Z is —O—;
D$_1$ is methylene or butylene; and
R$^{10}$ is methyl.

10. The method according to claim 3 in which
Q is unsubstituted or substituted carbocyclic aromatic of 6 to 18 ring carbon atoms;
D is branched or linear alkylene of 1 or 3 to 12 carbon atoms;
x has a value from 0 to 100;
y has a value from 0 to 20;
z has a value from 0 to 20.

11. The method according to claim 10 in which
R$^1$ is unsubstituted alkyl of 1 to 12 carbon atoms;
R$^2$ is alkyl of 1 to 12 carbon atoms;
R$^3$ is phenyl, alkylphenylene of 7 to 18 carbon atoms, or alkyl of 1 to 12 carbon atoms;
R$^4$ is alkyl of 1 to 12 carbon atoms, phenyl, alkylphenylene of 7 to 18 carbon atoms, or alkenyl of 2 to 12 carbon atoms;
R$^5$ is alkenyl of 2 to 12 carbon atoms, or substituted alkyl of 1 to 12 carbon atoms;
R$^6$ is alkyl of 1 to 12 carbon atoms, phenyl, alkylphenylene of 7 to 18 carbon atoms, or alkenyl of 2 to 12 carbon atoms.

12. The method according to claim 3 in which
Q is substituted or unsubstituted heterocyclic aromatic of 5 to 18 atoms, where the hetero atoms are selected from N, O and S;
D is branched or linear alkylene of 1 or 3 to 12 carbon atoms; and
x, y and z each, independently, has a value from 0 to 100.

13. The method according to claim 1 in which said polymeric material is a polyimide or poly(amide-imide) comprising the reaction product of an organic acid, anhydride or acid-anhydride with a bis(amino)-polysiloxane of formula

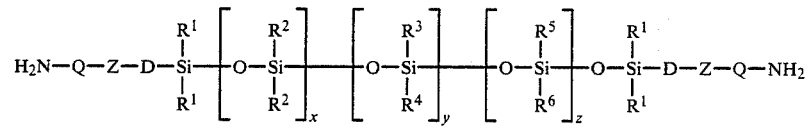

where
Q is a substituted or unsubstituted aromatic group;
Z is

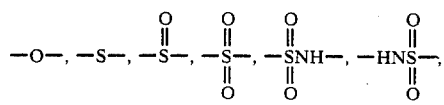

-continued

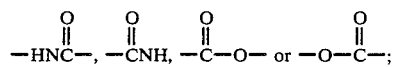

D is unsubstituted or substituted hydrocarbylene;
$R^1$, $R^2$, $R^3$, $R^4$, $R^5$ and $R^6$ each independently is unsubstituted or substituted hydrocarbyl;
x, y and z each independently has a value from 0 to 100.

14. The method according to claim 1 in which said polymeric material is a polyimide comprising the reaction product of a dianhydride component with an amine component, the dianhydride component comprising a dianhydride of formula

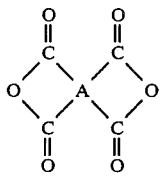

where A is a tetravalent benzene or naphthalene nucleus or a tetravalent group of formula

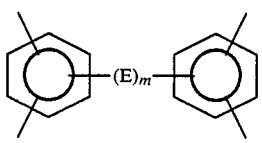

or

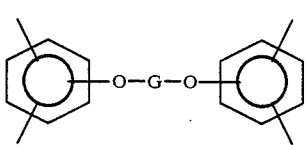

wherein G is phenylene or a group of formula

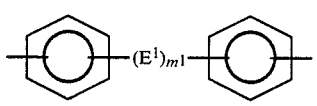

and where m and $m^1$ is each 0 or 1 and E and $E^1$ is each

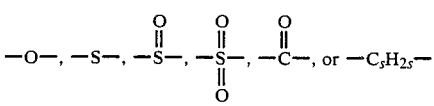

where s is an integer from 1 to 8; the amine component comprising a bis(amino)polysiloxane and, optionally, an organic diamine, the bis(amino)polysiloxane having the formula

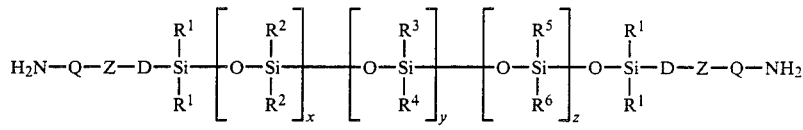

where
Q is a substituted or unsubstituted aromatic group;
Z is

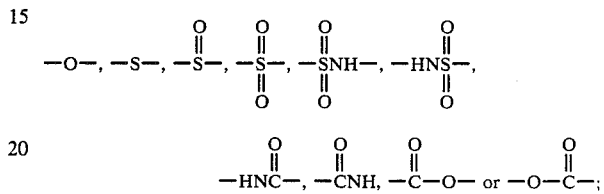

D is substituted or unsubstituted hydrocarbylene of 1 or 3 to 18 carbon atoms;
$R^1$, $R^2$, $R^3$, $R^4$, $R^5$ and $R^6$ each independently is unsubstituted or substituted hydrocarbyl; and
x, y and z, each independently, has a value from 0 to 100;
the organic diamine having the formula $$H_2N-Y-NH_2$$

where Y is phenylene, diphenylene, naphthylene or a group of formula

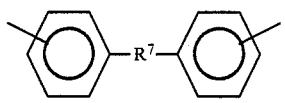

where $R^7$ is branched or linear alkylene of 1 to 20 carbon atoms,

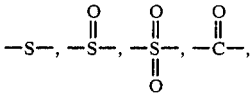

or —O—, or $R^7$ is —O—G'—O—, where G' is phenylene or group of formula

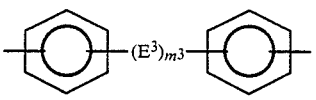

where $m^3$ is 0 or 1 and $E^3$ is

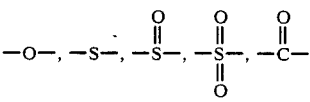

or linear or branched alkylene of 1 to 8 carbon atoms.

15. The method according to claim 1 in which said polymeric material is a polyimide or poly(amide-imide) which contains a siloxane unit of formula

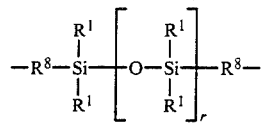

wherein

R$^8$ is a divalent hydrocarbon radical;
R$^1$ is a monovalent hydrocarbon radical; and
r is a whole number equal to or greater than 1.

16. The method according to claim 1 in which said polymeric material is a polyimide or poly(amide-imide) comprising the reaction product of an organic acid, anhydride or acid-anhydride with an organic diamine having the formula

H$_2$N—Y—NH$_2$ where Y is phenylene, diphenylene, naphthylene or a group of formula

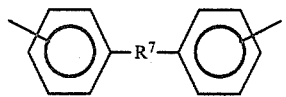

where R$^7$ is branched or linear alkylene of 1 to 20 carbon atoms,

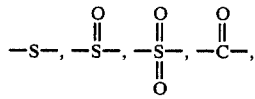

or —O—, or R$^7$ is —O—G'—O—, where G' is phenylene or group of formula

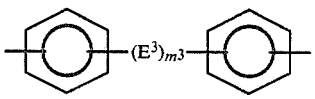

where m$^3$ is 0 or 1 and E$^3$ is

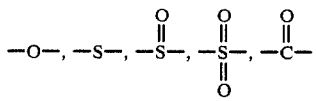

or linear or branched alkylene of 1 to 8 carbon atoms.

17. The method according to claim 16 in which said polyimide or poly(amide-imide) comprises the reaction product of the organic diamine with a dianhydride component comprising a dianhydride of formula

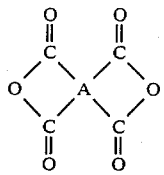

where A is a tetravalent benzene or naphthalene nucleus or a tetravalent group of formula

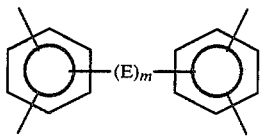

or

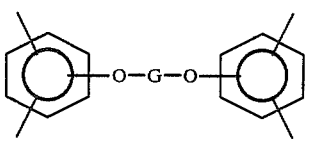

wherein G is phenylene or a group of formula

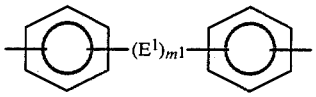

and where m and m$^1$ is each 0 or 1 and E and E$^1$ is each

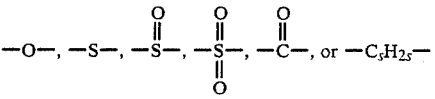

where s is an integer from 1 to 8.

18. The method according to claim 1 in which said modifying additive is selected from the group consisting of aromatic polyamines, aromatic aminoacids, aromatic polycarboxylic acids, aminophenols and carboxy phenols.

19. The method according claim 1 in which the nucleus of the aromatic modifying additive is a di-, tri- or tetravalent aromatic radical of 6 through 20 carbon atoms.

* * * * *